April 12, 1966     E. C. WEBB     3,245,685
PINFALL DETECTING APPARATUS WITH RECTANGULAR
SWITCH ACTUATING MEANS
Filed April 6, 1965     3 Sheets-Sheet 1
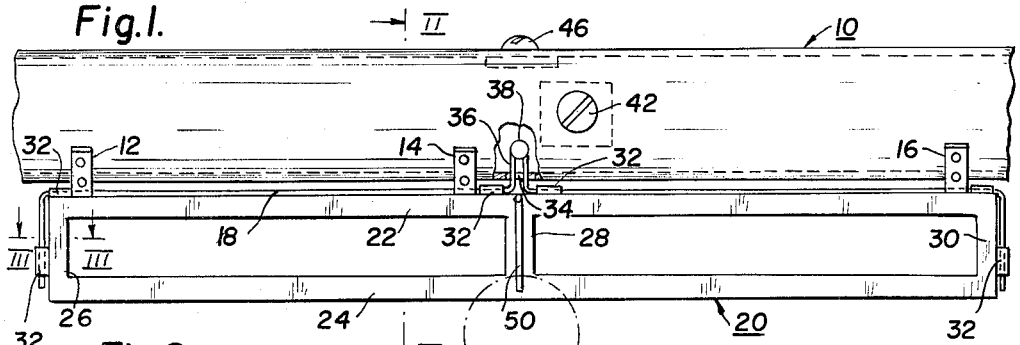
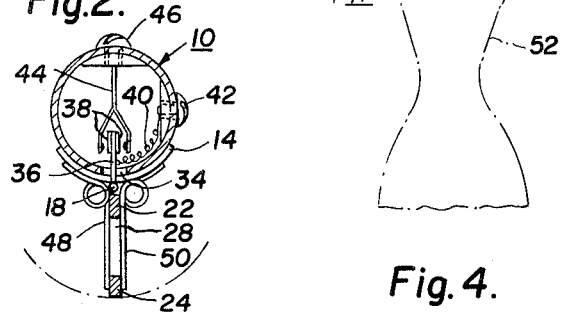
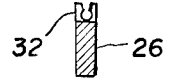
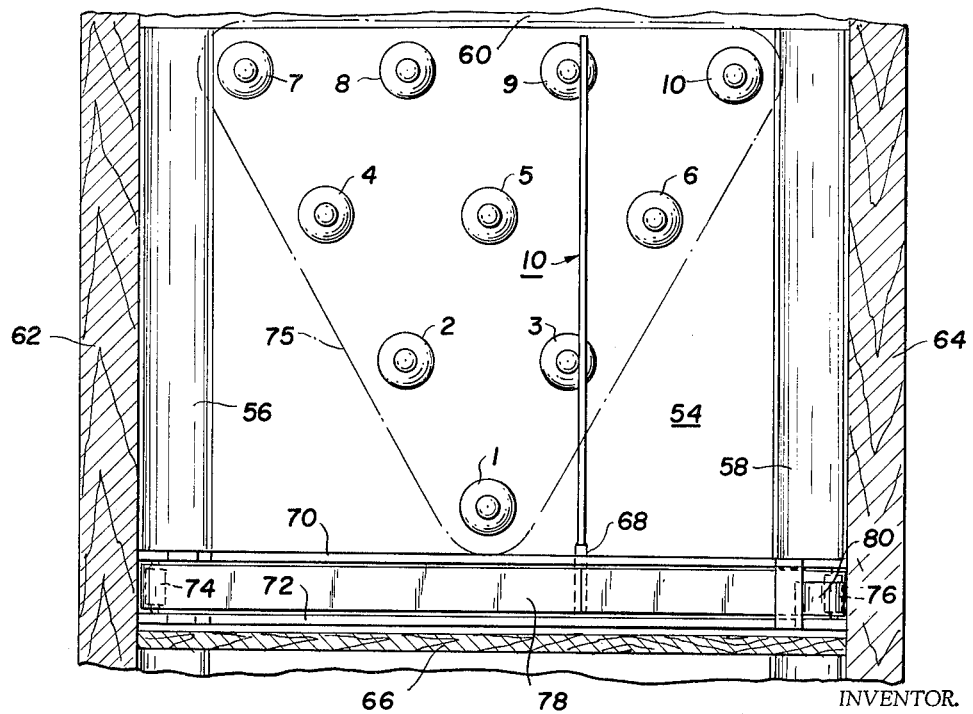
INVENTOR.
ERNEST C. WEBB
BY
his ATTORNEY

INVENTOR.
ERNEST C. WEBB

United States Patent Office 3,245,685
Patented Apr. 12, 1966

3,245,685
PINFALL DETECTING APPARATUS WITH RECTANGULAR SWITCH ACTUATING MEANS
Ernest C. Webb, Bay Village, Ohio, assignor to The Cleveland Trust Company, as trustee, Cleveland, Ohio
Filed Apr. 6, 1965, Ser. No. 445,897
12 Claims. (Cl. 273—54)

This application is a continuation in part of copending application Serial No. 221,701, filed September 6, 1962, and now abandoned.

This invention relates to apparatus for automatically detecting the number of pins which remain standing on a pin deck after each ball is delivered in a bowling game. More particularly, the invention relates to bowling pin detecting apparatus in which no modifications need be made to the pins themselves in order to detect them.

As is known, various systems have been proposed for detecting standing pins on a bowling alley pin deck by providing electrically detectable devices in the pins together with apparatus for detecting those devices. For example, in copending application Serial No. 134,809, filed September 7, 1961, a pinfall detecting system is described in which the number of pins knocked down by each ball is determined by first producing a number of electrical impulses corresponding to the number of pins left standing, and thereafter using those impulses to produce a number of signals equal to ten minus the number of aforesaid pulses. This is accomplished in accordance with the said application by providing means in the top or bottom of each pin which can be detected electrically by a proximity device movable along a horizontal plane slightly above the tops or below the bottoms of standing pins and adapted to produce an impulse by passing over the top or under the bottom of any standing pin. For example, the means in the top or bottom of each pin may comprise a permanent magnet, and the proximity device may comprise an electrical coil assembly, the arrangement being such that the coil assembly will cut through the lines of flux produced by the permanent magnets whereby a current impulse is induced in the coil assembly each time it passes over or under a standing pin. The permanent magnets of fallen pins, however, cannot affect the coil and, hence, will not produce current impulses. By using the current impulses in circuitry including stepping switches and relays, a number of electrical signals can be obtained equal to ten minus the number of current impulses produced by the coil assembly, these signals being equal in number to the number of fallen pins.

Although a system of the type described above performs exceptionally well for its intended purpose, it necessitates the use of a metal or the like device in each pin which can be electrically detected, a condition which may be considered undesirable in certain circumstances.

Accordingly, as one object, the present invention seeks to provide bowling pin detecting apparatus in which the pins are detected without providing any metallic or the like device in the pins themselves.

More generally, an object of the invention is to provide a new and improved standing pin detecting apparatus wherein the pins are detected by physical contact with a detecting element.

A further object of the invention is to provide pinfall detecting apparatus for a bowling game capable of producing electrical signals which may be used in an automatic scoring, totalizing, indicating and/or printing system.

Still another object of the invention is to provide pinfall detecting apparatus which is positioned on the sweep arm of an automatic pin-spotter, the arrangement being such that no mechanism, other than the detecting elements themselves, need be added to the pin-spotter for the purpose of detecting standing pins.

In accordance with the invention, the apparatus for detecting standing pins comprises a member movable along a substantially horizontal path above a pin deck past the ends of pins, at least one element hinged to the member and arranged to contact ends of standing pins and rotate about its hinged connection to the member when the member passes a pin, and means for producing an electrical signal indicative of the standing condition of a pin when the detecting element rotates about its hinged connection upon passage of the element past a pin. As will be seen, the aforesaid member and the detecting element may pass over either the tops of the pins or beneath the bottoms of those pins. In the former case, one or more detecting elements are swept across the tops of the pins immediately after a ball is delivered in a bowling game, and before the pins are respotted. In the latter case, the apparatus is used in conjunction with an automatic pin-spotter, and the pins are detected only after the pin-spotter picks up the pins from the pin deck during a spotting cycle. The operation is such that when the pins are elevated off of the pin deck, one or more detecting elements are swept across the bottoms of the pins, those pins being ones which remain standing after the delivery of a ball in a bowling game.

In accordance with another aspect of the invention, the aforesaid detecting elements may be mounted on the sweep arm of a conventional pin-spotter, the arrangement being such that when the pins are elevated in a pin-spotting operation and the sweep arm moved beneath those pins, one or more detecting elements mounted on the sweep arm will engage the pins suspended from the pin-spotter, the number of such pins being equal to those which remain standing after a ball is delivered in a bowling game.

The above and other objects and features of the invention will become apparent from the following detailed description taken in connection with the accompanying drawings which form a part of this specification, and in which:

FIGURE 1 is a detailed plan view of the basic detecting apparatus of the present invention;

FIG. 2 is a cross-sectional view taken substantially along line II—II of FIG. 1;

FIG. 3 is a cross-sectional view taken along line III—III of FIG. 1;

FIG. 4 is a top view of a bowling alley pin deck showing one manner in which detecting devices, similar to those shown in FIG. 1, can be swept across the ends of pins;

Figure 5:
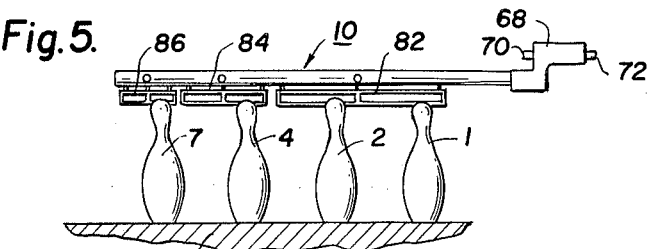
FIG. 5 is a plan view of one type of arrangement wherein three detecting devices are swept across the tops of pins on a bowling alley with each detecting device covering the pins in a zoned area.

Referring now to the drawings, and particularly to FIG. 1, the basic arrangement for detecting standing pins comprises a member 10 which is swept across the tops or bottoms of the pins, in a manner hereinafter described, along a substantially horizontal path. In the particular embodiment of the invention shown herein, the member 10 comprises an elongated tube. Spaced along the length of tube 10 are hinges 12, 14 and 16 which carry, for pivotal movement, a spring-wire clip 18. As shown, the clip 18 carries a very lightweight plastic frame 20 having an upper horizontal part 22, a lower horizontal part 24 and three vertical spacers 26, 28 and 30. Integrally formed with the plastic frame 20, along the edges of end spacers 26 and 30 and the top horizontal member 22, are a plurality of clips 32, possibly best shown in FIG. 3, which receive the spring-wire clip 18. Thus, the clip 18 and the frame 20 will rotate about the hinges 12, 14 and 16 as a single unit. Although the frame 20 is shown herein with cutout portions, it should be understood that a solid sheet of lightweight plastic such as polypropylene could be used with equal effectiveness.

Provided in the bottom of the tubular member 10, as best shown in FIG. 2, is a slot 34. Extending through the slot 34 is a hairpin projection 36 on the spring-wire clip 18. The upper end of the hairpin projection 36 is provided with contacts 38 on its opposite sides, and is connected through an electrical lead 40 to a terminal screw 42 which is insulated from the member 10. On either side of the contacts 38 are the opposing legs of a bifurcated contact 44 which is connected to a second terminal screw 46, also insulated from the member 10.

With the arrangement shown, it can be seen that rotation of the frame 20 in either direction will cause one of the contacts 38 on the hairpin projection 36 of wire clip 18 to engage one leg of the bifurcated contact 44; while rotation of the frame 20 in the oppoiste direction will cause the other contact 38 to engage the other leg of the bifurcated contact 44. On either side of the frame 20 is an anti-bounce spring 48 or 50 comprising a coil of wire having one leg bearing against the center spacer 28 and of the frame 20 and the other leg bearing against the side of the tube 10. These springs 48 and 50, as will be understood, serve to maintain the frame 20 in a vertical plane at all times except when a force is imparted to the frame to rotate it in one direction or the other.

In the operation of the device, the member 10 may be swept across the top of a bowling pin, such as pin 52 illustrated in FIG. 1, such that the lower edge of the lightweight plastic frame 20 will engage the uppermost tip of the pin. When this occurs, the frame 20, being of extremely light weight material, will be caused to rotate about its hinged connection to the member 10; whereupon one of the contacts 38 will engage the contact 44 to complete an electrical circuit between the terminals 42 and 46, thereby indicating the standing condition of the pin. Needless to say, the weight of frame 20 and the strength of springs 48 and 50 must be such that the frame will not knock over the pin as it passes thereover. Rather, the pin will cause the frame 20 to rotate about its pivotal connection to member 10 without itself being displaced or even caused to wobble on the pin deck. As will be seen, the entire assembly of FIG. 1 can be inverted for detecting the bottoms of pins suspended from an automatic pin-spotter. In this latter case, the operation is exactly the same as that already described with the exception that the bottoms of the pins, rather than their tops, are engaged by the frame 20. Furthermore, it will be appreciated that when the bottoms of the pins are engaged as they are suspended from an automatic pin-spotter, the tension on springs 48 and 50 is not as critical as it might be for passage over the tops of the pins since they will be positively supported by the gripper arms of the pin-spotter during this time.

As one specific example of the invention which has been found to operate extremely satisfactorily, the member 10 comprised of a one inch diameter aluminum tube, while the frame 20 consisted of a solid sheet of polypyropylene plastic having a thickness of one-sixteenth inch. The springs 48 and 50 and the clip 18 comprised 0.020 inch phosphor bronze wire; although stainless steel wire could be used in its place.

Referring now to FIG. 4, one arrangement is shown for sweeping a plurality of plastic frames, such as frame 20 shown in FIG. 1, across the ends of pins. The usual bowling alley is shown having a pin deck 54 with ten pins positioned thereon in the usual triangular configuration and numbered 1 through 10. On either side of the pin deck 54 are gutters 56 and 58, while behind the pin deck 54 is a pit 60. On either side of the pin deck 54 are kickbacks 62 and 64 which serve, among other things to separate adjacent bowling alleys. Extending between the kickbacks 62 and 64 is facing board 66 which, in accordance with the usual bowling alley construction, covers an automatic pin-spotter and its associated mechanism in its raised position, but does not extend down far enough toward the alley to obstruct the view of the pins positioned thereon.

The member 10 is swept across the ends of pins 1–10 in the embodiment of the invention shown in FIG. 4 by means of a mechanism which is the subject of my copending application Serial No. 199,063, filed May 31, 1962, now now Patent No. 3,185,477. For a full and detailed description of the traversing mechanism, reference may be had to the aforesaid application; however for purposes of the present application it will be sufficient to state that the member 10 is suspended from a carriage 68 in cantilever beam relationship, this carriage 68 being movable along guideways or tracks 70 and 72 both located at the forward end of the pin-spotter and extending between the kickbacks 62 and 64. The outline of the pin-spotter is indicated by the broken line 75. At opposite ends of the guideways 70 and 72 are rolls 74 and 76, and extending around the rolls 74 and 76 is a taut band 78 of spring steel or the like. This band is connected, at one point along its length, to the carriage 68, the arrangement being such that as the band moves around the rolls 74 and 76 the carriage 68 and the member 10 carried thereby will be caused to traverse the pin deck 54. A motor 80 is employed to rotate the roll 76 and thus cause the band 78 to move around rolls 74 and 76 in a manner which is more fully explained in my aforesaid patent No. 3,185,477.

Referring now to FIG. 5, it can be seen that in one embodiment of the invention there are three plastic frames 82, 84 and 86, each of which is identical in construction to frame 20 shown in FIG. 1 and pivotally carried on the member 10. The first frame 82 extends from a point slightly in front of the single number 1 pin to a point slightly in front of the row of pins comprising pin numbers 4, 5 and 6 shown in FIG. 4; the second frame 84 extends from a point ahead of the 4–5–6 row of pins to a point slightly in front of the 7–8–9–10 row of pins; and the third frame 86 extends from a point in front of the 7–8–9–10 row of pins to a point behind that row of pins. With the arrangement shown, each frame 82, 84 and 86 will sweep across a zoned area of the pin deck.

The necessity for a plurality of zones will be appreciated when it is remembered that it is necessary to produce a single and separate electrical signal by closure of contacts 38 and 44 for each standing pin on the deck 54. That is, it can be seen from FIG. 4 that the number 1 pin is directly in front of the number 5 pin. Similarly, the number 2 pin is directly in front of the number 8 pin, and the number 3 pin is directly in front of the number 9 pin. If a single frame, such as frame 20 shown in FIG. 1, were swept across the tops of the pins, a single electrical signal would be produced for both of the pins 2 and 8, both of the pins 1 and 5, and both of the pins 3 and 9, meaning that if all pins were standing, only seven current impulses would be produced by the single frame; whereas it is desired to produce ten signals. With the arrangement shown in FIG. 5, however, none of the pins in any zone are aligned with other pins in that same zone so that the cumulative number of signals produced by the three frames will always be ten, assuming that all of the pins are left standing. Of course, if certain ones of the pins are knocked down after a ball is delivered, only the cumulative number of signals corresponding to the number of pins left standing will be produced by the frames. Furthermore, even though certain ones of the pins may slide on the deck to positions where they are directly in front of other pins, the correct number of signals will always be produced. To illustrate, suppose that the ball strikes the number 1 pin. Under these circumstances, the number 1 pin will always be knocked down under the impact of the ball. Certain ones of the pins, however, may slide when the ball rolls into the triangular configuration of pins shown in FIG. 1. Let us assume, for example, that the number 4 pin slides to a position where it is directly in front of the number 7 pin. Under these circumstances, two electrical signals will still be produced for the number 4 and 7 pins, with the signal for the number 4 pin being produced by frame 84 while the signal for pin number 7 is produced by frame 86. Since all pins will usually slide either to the side or toward the pit 60, there is a possibility of a single signal for two pins in the zone covered by frame 82 where the number 1 pin could conceivably be aligned with pin number 2 or pin number 3. However, as was explained above, pin number 1 will be struck directly by the moving ball, meaning that it will not slide in the zone covered by frame 82 in an upright position where a single electrical signal can be produced for two standing pins. Thus, the apparatus shown provides a means whereby a single current impulse will be produced by one of the frames 82, 84 or 86 for each standing pin even though certain ones of the pins may slide from their correctly-spotted positions.

Figure 6:
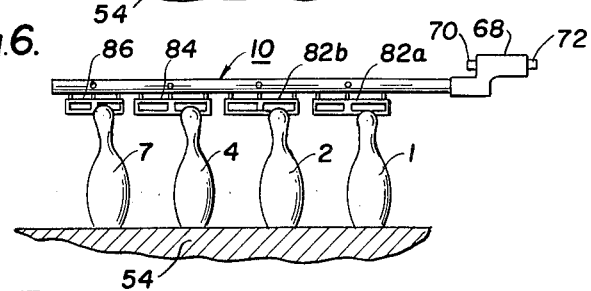
FIG. 6 is an illustration of an arrangement, similar to that of FIG. 5, but employing four detecting devices which sweep across the tops of standing pins.

Referring now to FIG. 6, the arrangement of the invention shown is similar to that of FIG. 5 except that in this case the forward frame 82 of FIG. 5 is divided into two frames 82a and 82b. In this latter case, the number 1 pin and the pins in the 2–3 row are in separate zones so as to minimize any possibility of a single switch closure for two pins.

Figure 7:
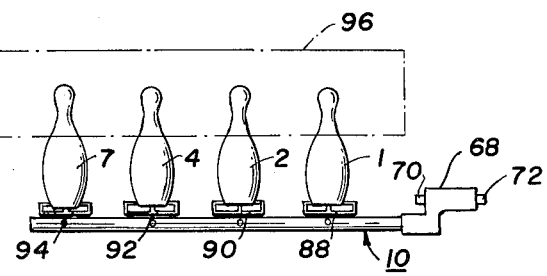
FIG. 7 is a side view of an arrangement for detecting pins wherein the detecting devices are swept across the bottoms of pins elevated by an automatic pin-spotting machine.
Figure 8:
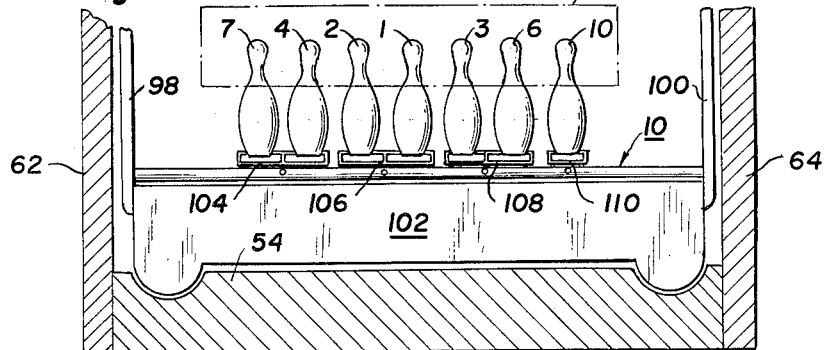
FIG. 8 is an end view of still another arrangement for detecting pins wherein the pin detecting devices are carried on the sweep arm of an automatic pin-spotter and arranged to engage the bottoms of the pins when they are elevated during a pin-spotting operation.
Figure 9:
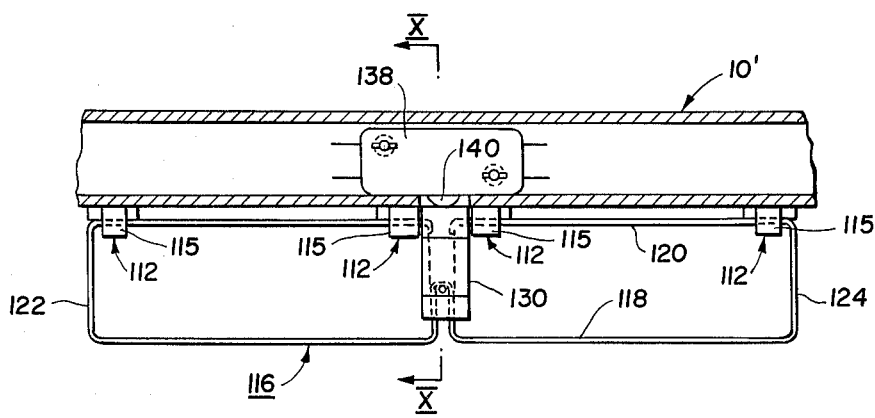
FIG. 9 is a partially broken-away view of another embodiment of the detecting element of the invention.

With reference now to FIG. 7, the arrangement shown is similar to that of FIGS. 5 and 6 except that the detecting elements or frames 88, 90, 92 and 94 are pivotally carried on pin-spotter. As is known, the sweep arm 102 is employed to sweep fallen pins off of the pin deck after each ball is delivered in a bowling game. In this case, four frames 104, 106, 108 and 110 are employed to prevent two pins from being contacted simultaneously by any one frame, although other combinations could be used by slight modification. This will be appreciated from an examination of the triangular configuration of pins shown in FIG. 4. The operation of the embodiment of FIG. 8 is the same as that of FIG. 7, and will require that the pins be gripped and picked up by the pin-spotter 96 in the second ball cycle as well as the first ball cycle.

The number of electrical signals or switch closures obtained with the detecting elements of the present invention will, of course, be equal in number of standing pins. In order to electrically subtract this number (i.e., the number of standing pins) from ten to obtain the number of fallen pins after each ball delivery and thus enable scoring of the game, circuitry such as that shown in the aforesaid copending application Serial No. 134,809 or U.S. Patent No. 3,124,355 may be employed.

Referring now to FIGS. 9–12, another embodiment of the pin sensing member is shown wherein the elongated bar which sweeps across the tops of the pins is rectangular in configuration and identified by the reference numeral 10'. Secured to the bottom of the member 10' by screws 111 are four bearing blocks 112. Each bearing block 112 is provided with a central flat portion 113, a flange 114 which abuts the back of the member 10' and an arcuate, downwardly depending portion 115 having an opening extending therethrough. The openings in the arcuate portions 115 receive a wire detecting vane, perhaps best shown in FIG. 12.

The detector vane, indicated generally by the reference numeral 116, is generally rectangular in configuration and bounded by a bottom portion 118, a top portion 120 and two end portions 122 and 124. The bottom portion 118 is provided, as shown, with an upwardly-extending looped portion 126; while the top portion 120 is broken as at 128. In this respect, it will be appreciated that the detector vane 116 is formed from a single length of wire having its opposite ends 128 in abutting relationship.

Figure 12:
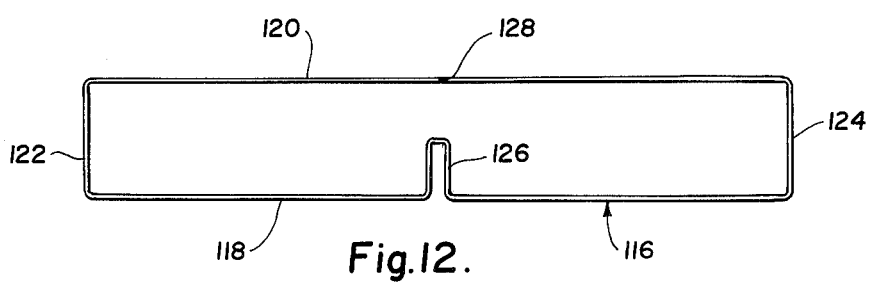
FIG. 12 is a plan view of the wire vane per se used in the embodiment of FIG. 9.

The top portion 120 of the wire detector vane 116 passes through the openings in the arcuate portions 115 of bearing blocks 112. The looped portion 126 and the ends 128 of the top portion 120 are carried within a vane cam 130, perhaps best shown in FIG. 11. The vane cam 130 is preferably formed from Delrin (Trademark) or some similar plastic material and is provided with a central, longitudinal opening 132. The ends 128 of the top portion 120, which abut when the vane is initially formed as shown in FIG. 12, pass through openings 134 in the sides of the cam 130 and are bent downwardly into the longitudinal opening 132. Similarly, the looped portion 126 in the bottom portion 118 of vane 116 passes upwardly into the bottom of the opening 132 and is secured therein by means of a wire locking pin 136 (FIG. 10) which passes through an opening extending transverse to the longitudinal opening 132. With the arrangement shown, it will be appreciated that the cam 130 rotates about the bearing blocks 112 along with the wire vane 116 and that the vane 116 lies in a flat plane, as perhaps best shown in FIG. 10.

As the member 10' passes over the tops of pins, the bottom portion 118 will contact the tops of standing pins, whereby the vane 116 and the vane cam 130 will rotate about the bearing blocks 112.

Figure 10:
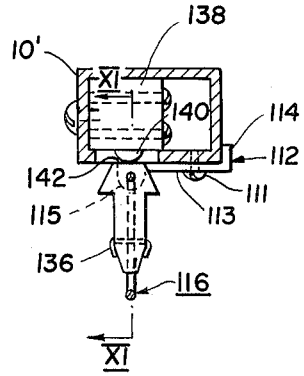
FIG. 10 is a cross-sectional view taken along line X—X of FIG. 9.
Figure 11:
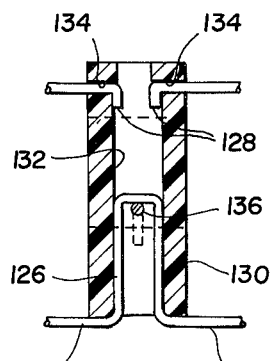
FIG. 11 is a cross-sectional view taken along line XI—XI of FIG. 10.

Carried within the member 10' is an electrical switch 138 having a downwardly-depending actuating plunger 140, the arrangement being such that the switch will be actuated to indicate the presence of a standing pin when the plunger 140 is pushed upwardly. With reference to FIG. 10, it can be seen that as the vane 116 and cam 130 rotate about the bearing blocks 112, an upper cam surface 142 will assume an inclined position and will force the actuating plunger 140 upwardly. In the usual case, auxiliary spring means, not shown, will be provided to return the vane 116 to its vertical position in the event that its rotation causes the edges of surface 142 to pass beyond plunger 140. Thus, it can be seen that the operation of the embodiment shown in FIGS. 9–12 is the same as that of FIGS. 1–3, with the exception that a wire vane 116 is substituted for the lightweight plastic frame 20.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. Apparatus for detecting a standing pin on a bowling alley pin deck comprising a member movable along a substantially horizontal path over the top of the pin, a device suspended from said member and arranged to contact the top of a standing pin when the member passes over the pin, said device comprising an integral, generally rectangular flat element suspended from said member such that its horizontal length is greater than its vertical height, the device being constructed and arranged such that it will not knock over a pin upon contact therewith as the member passes over the pin, and means for producing an electrical signal indicative of the standing condition of the pin when the flat element contacts the pin.

2. Apparatus for detecting standing pins on a bowling alley pin deck comprising a member movable along a substantially horizontal path over the tops of the pins, a downwardly-depending device hinged to said member and arranged to contact the top of a standing pin as the member passes over that pin whereby the device will rotate about its hinged connection to the member without knocking over the pin, said device comprising an integral, generally rectangular flat element suspended from said member such that its horizontal length is greater than its vertical height, and means for producing an electrical signal indicative of the standing condition of a pin when the flat element rotates about its hinged connection to said member.

3. Apparatus for detecting standing pins on a bowling alley pin deck comprising a member movable along a substantially horizontal path above the tops of the pins, a downwardly-depending device hinged to said member and arranged to contact the top of a standing pin as the member passes over that pin whereby the device will rotate about its hinged connection to the member without knocking over the pin, said device comprising a generally rectangular flat element suspended from said member such that its horizontal length is greater than its vertical height, and a switch device operatively connected to said flat element and adapted to be actuated when said flat element rotates about its hinged connection to the member, the arrangement being such that the switch device will be actuated to indicate the standing condition of a pin when the member passes over that pin.

4. Apparatus for detecting standing pins on a bowling alley pin deck comprising an elongated member having a length substantially equal to the length of one transverse dimension of the pin deck and movable along a substantially horizontal path past ends of the pins along the other transverse dimension of the pin deck, a plurality of devices spaced along the length of said member and pivotally connected thereto, each of said devices comprising an integral, generally rectangular flat element pivotally connected to said member such that its horizontal length is greater than its vertical height, each of the flat elements being adapted to contact the end of a standing pin within a zoned area of the pin deck and rotate about its pivotal connection to the member without knocking over a pin when it passes over that pin within its zoned area, and means for producing an electrical signal indicative of the standing condition of a pin when any one of said flat elements rotates about its pivotal connection to the member.

5. Apparatus for detecting standing pins on a bowling alley pin deck comprising a member movable along a substantially horizontal path past ends of the pins, a device pivotally carried on said member and arranged to contact the end of a standing pin and rotate about its pivotal connection to the member without knocking over a pin when the member passes that pin, said device normally lying in a vertical plane and comprising an integral, generally rectangular flat element pivotally connected to said member such that its horizontal length is greater than its vertical height, means for resiliently maintaining said flat element in a substantially vertical plane, and a switch device operatively connected to said flat element and having a first position when the flat element is in a substantially vertical plane and a second position when the flat element is rotated about its pivotal connection to said member upon passage over the end of a pin, the arrangement being such that the number of times that the element moves from its first position to its second position will be equal to the number of standing pins which the member has passed in its horizontal path of travel.

6. The apparatus of claim 5 wherein said flat element comprises a lightweight plastic or the like frame, the said frame having a spring-wire clip thereon for maintaining it in a vertical plane.

7. In a bowling game having ten pins arranged in a triangular configuration at the end of an alley with a first row of four pins extending transversely across the alley at its extreme end, a second row of three pins positioned in front of said first row and extending transversely across the alley, a third row of two pins in front of said second row and also extending transversely across the alley, and a single pin located in front of the third row midway between the two pins therein; the combination of apparatus for producing a number of electrical signals indicative of the number of standing pins on the alley comprising an elongated member extending over said triangular configuration substantially parallel to the long transverse dimension of said alley, means for moving said elongated member past the ends of said pins along a horizontal path which extends transverse to the alley, a first element hinged to said member and extending from a point slightly in front of said single pin to a point slightly in front of said second row of pins, a second element hinged to said member and extending from a point ahead of said second row of pins to a point slightly in front of the first row of pins, a third element hinged to said member and extending from a point in front of the first row of pins to a point behind the first row of pins, said elements comprising flat plates of rectangular configuration hinged to said member such that their lengths along the member are greater than their widths at right angles thereto, each of said elements being adapted to contact the ends of standing pins and rotate about its hinged connection to the member when the member passes pins, and means associated with each of said elements for producing an electrical signal indicative of the standing condition of a pin when the element rotates about its hinged connection to said member.

8. In a bowling game having ten pins arranged in a triangular configuration at the end of an alley with a first row of four pins extending transversely across the alley at its extreme end, a second row of three pins positioned in front of said first row and extending transversely across the alley, a third row of two pins in front of said second row and also extending transversely across the alley, and a single pin located in front of the third row midway between the two pins therein; the combination of apparatus for producing a number of electrical signals indicative of the number of standing pins comprising an elongated member extending parallel to the long transverse dimension of said alley, means for moving said member past the ends of the pins along a path of travel which extends transverse to the alley, a first element hinged to said member and extending from a point slightly in front of said single pin to a point slightly in front of said third row of pins, a second element hinged to said member and extending from a point slightly ahead of said third row of pins to a point slightly in front of the second row of pins, a third element hinged to said member and extending from a point slightly in front of said second row of pins to a point slightly in front of the first row of pins, a fourth element hinged to said member and extending from a point in front of the first row of pins to a point behind the first row of pins, said elements comprising flat plates of rectangular configuration hinged to said member such that their lengths along the member are greater than their widths at right angles thereto, each of said elements being adapted to rotate about its hinged connection to the member when the member passes pins, and means associated with each of said elements for producing an electrical signal indicative of the standing condition of a pin when the element rotates about its hinged connection to said member.

9. Apparatus for detecting standing pins on a bowling alley pin deck comprising a member movable along a substantially horizontal path over the tops of the pins, a downwardly-depending assembly hinged to said member and arranged to contact the top of a standing pin as the member passes over that pin whereby the assembly will rotate about its hinged connection to the member without knocking over the pin, said assembly including a generally rectangular element suspended from said member such that its horizontal length is greater than its vertical height, the upper long transverse edge of the rectangular element being hinged to said member, and means for producing an electrical signal indicative of the standing condition of a pin when the element rotates about its hinged connection to said member.

10. The apparatus of claim 9 wherein the rectangular element normally lies in a generally vertical flat plane when it is not in contact with a pin.

11. Apparatus for detecting standing pins on a bowling alley pin deck comprising a member movable along a substantially horizontal path over the tops of the pins, a wire member bent to peripherally define a generally ractangular element, means for hingedly suspending said element from said member such that the element depends downwardly from the member and has a horizontal length greater than its vertical height, the element being arranged to contact the top of a standing pin as the member passes over that pin whereby the element will rotate about its hinged connection to the member without knocking over the pin, and means for producing an electrical signal indicative of the standing condition of a pin when the element rotates about its hinged connection to said member.

12. The apparatus of claim 11 wherein said means for producing an electrical signal indicative of the standing condition of a pin comprises a switch carried by said member and actuable by depression of an actuating plunger, and a cam device carried by said wire element and arranged to depress said plunger to actuate the switch when the element is rotated about its hinged connection to the member upon passage over the top of a standing pin.

References Cited by the Examiner

UNITED STATES PATENTS

| | | | |
|---|---|---|---|
| 2,440,587 | 4/1948 | Krall | 200—61.44 |
| 2,519,285 | 8/1950 | Rhoads | 273—42 X |
| 2,788,212 | 4/1957 | Montooth | 273—42 |
| 2,840,688 | 6/1958 | Scott | 200—61.42 X |
| 3,118,983 | 1/1964 | Jenkins | 200—61.42 |

DELBERT B. LOWE, *Primary Examiner.*